(12) United States Patent
Deych et al.

(10) Patent No.: US 8,558,180 B2
(45) Date of Patent: Oct. 15, 2013

(54) X-RAY DETECTOR WITH IMPROVED QUANTUM EFFICIENCY

(75) Inventors: Ruvin Deych, Gloucester, MA (US); Charles Shaughnessy, Hamilton, MA (US)

(73) Assignee: Analogic Corporation, Peabody, MA (US)

( * ) Notice: Subject to any disclaimer, the term of this patent is extended or adjusted under 35 U.S.C. 154(b) by 609 days.

(21) Appl. No.: 12/874,408

(22) Filed: Sep. 2, 2010

(65) Prior Publication Data

US 2012/0056092 A1 Mar. 8, 2012

(51) Int. Cl.
*G01T 1/20* (2006.01)
*G01T 1/24* (2006.01)
*G01T 1/26* (2006.01)
*H05G 1/64* (2006.01)
*H05G 1/22* (2006.01)

(52) U.S. Cl.
USPC ............... 250/361 R; 250/370.08; 250/371; 378/98; 378/98.8; 378/106

(58) Field of Classification Search
USPC ...... 250/361 R, 370.08, 371, 370.09, 370.11, 250/370.06; 378/98, 98.8, 106
See application file for complete search history.

(56) References Cited

U.S. PATENT DOCUMENTS 7,161,155 B1 1/2007 Deych

OTHER PUBLICATIONS

Monajemi; et al., "Modeling scintillator-photodiodes as detectors for megavoltage", Med. Phys. 31(5), May 2004, pp. 1225-1234.
Rathee: et al., "A bench-top megavoltage fan-beam CT using CWO-photodiode detectors", Med. Phys. 33(4), Apr. 2006, pp. 1078-1089.

*Primary Examiner* — David Porta
*Assistant Examiner* — Faye Boosalis
(74) *Attorney, Agent, or Firm* — Cooper Legal Group LLC

(57) ABSTRACT

Among other things, one or more systems and/or techniques for integrating electrical charge yielded from an indirect conversion detector array of a pulsating radiation system are provided. The integration begins during a resting period between a first and second pulse and ends before the second pulse is emitted. Electrical charge that is measured during a resting period is integrated, while electrical charge measured during a pulse is not integrated. In this way, parasitic contributions caused by the direct interaction of radiation photons with a photodiode are reduced and a quantum efficiency of the indirect conversion detector array is increased, for example. Moreover, the period of integration can be adjusted such that a voltage gain related to the indirect conversion detector array can be varied to a predetermined level.

20 Claims, 5 Drawing Sheets

X-RAY DETECTOR WITH IMPROVED QUANTUM EFFICIENCY

BACKGROUND

The present application relates to the field of radiography or computed tomography examinations and imaging. It finds particular application with pulsed imaging systems that comprise an indirect conversion detector array, such as those commonly comprised within a line scanner, mammography scanner, CT scanner, IMRT scanner, security scanner, or other radiographic imaging system.

Radiographic imaging systems provide information, or images, of an object under examination or rather interior aspects of the object. For example, in radiographic imaging systems, the object is exposed to radiation, and one or more images are formed based upon the radiation absorbed by the object, or rather an amount of radiation that is able to pass through the object. Typically, highly dense objects absorb (e.g., attenuate) more radiation than less dense objects, and thus an object having a higher density, such as a bone or gun, for example, will be apparent when surrounded by less dense objects, such as fatty tissue or clothing, for example.

Radiographic imaging systems typically comprise a detector array and a radiation source. The radiation source is generally configured to emit a fan, cone, wedge, or other shaped beam of radiation onto an object under examination. The detector array is generally positioned on a diametrically opposing side of the object relative to the radiation source and comprises a plurality of pixels configured to detect electrical charge created from radiation that impinges the detector array.

Direct conversion and indirect conversion detector arrays are two types of detector arrays commonly used in radiographic imaging systems. Direct conversion detector arrays are configured to convert x-ray photons directly into electrical charge using a photoconductor (e.g., amorphous selenium). Indirect conversion detector arrays are configured to convert radiation photons into light using a pixilated scintillator array, for example. The light can then be converted into an electrical charge using a photodetector and the electrical charge can be detected and/or collected by respective pixels of the detector array. It will be appreciated that there are numerous types of photodetectors known to those skilled in the art. For example, solid state indirect radiation detectors may comprise silicon p-i-n photodiodes as a photodetector. Other semiconductor devices can also be used, such as amorphous silicon photodiodes, CCD, etc., for example.

In such detector arrays, it is desirable to increase the detective quantum efficiency (DQE) of the detector array to improve images resulting from the examination. The DQE can be understood as the ratio of the amount of information contained in the output signal of the detector to the amount of information in the input radiation flux. The former is generally reduced due to imperfections of the detector array, including electronic noise, nonuniformity of the output, non-linearity, etc., for example. Moreover, in indirect conversion detector arrays, the DQE can be negatively affected by parasitic contributions (e.g., due to an increase in so-called Swank noise) that are caused by x-ray photons that interact directly with the photodiode without interacting with the scintillator material (e.g., the x-ray photons are not converted to light before being converted into electrical charge).

SUMMARY

Aspects of the present application address the above matters, and others. According to one aspect, a method is provided. The method comprises integrating electrical charges produced by a photodiode of an indirect conversion detector array during a resting period between pulses of radiation and not integrating electrical charges produced while a pulse of radiation is being emitted by a radiation source.

According to another aspect, a radiography examination apparatus is provided. The apparatus comprises an integration component configured to integrate electrical charge produced by an indirect conversion detector array during a specified time interval to generate a signal. The apparatus also comprises a trigger component configured to specify a start of the integration. The trigger component is also configured to trigger the integration component to start the integration during a resting period between pulses of radiation during an examination operation.

According to another aspect, a method is provided. The method comprises integrating electrical charges produced by a photodiode of an indirect conversion detector array. The integrated electrical charges are produced between time "m" and time "n." Time "m" is a time after which a first pulse is emitted from a radiation source during an examination operation, and time "n" is a time before a second pulse, subsequent to the first pulse, is emitted during the examination operation.

Those of ordinary skill in the art will appreciate still other aspects of the present application upon reading and understanding the appended description.

FIGURES

The application is illustrated by way of example and not limitation in the figures of the accompanying drawings, in which like references indicate similar elements and in which.

DESCRIPTION

Figure 1:
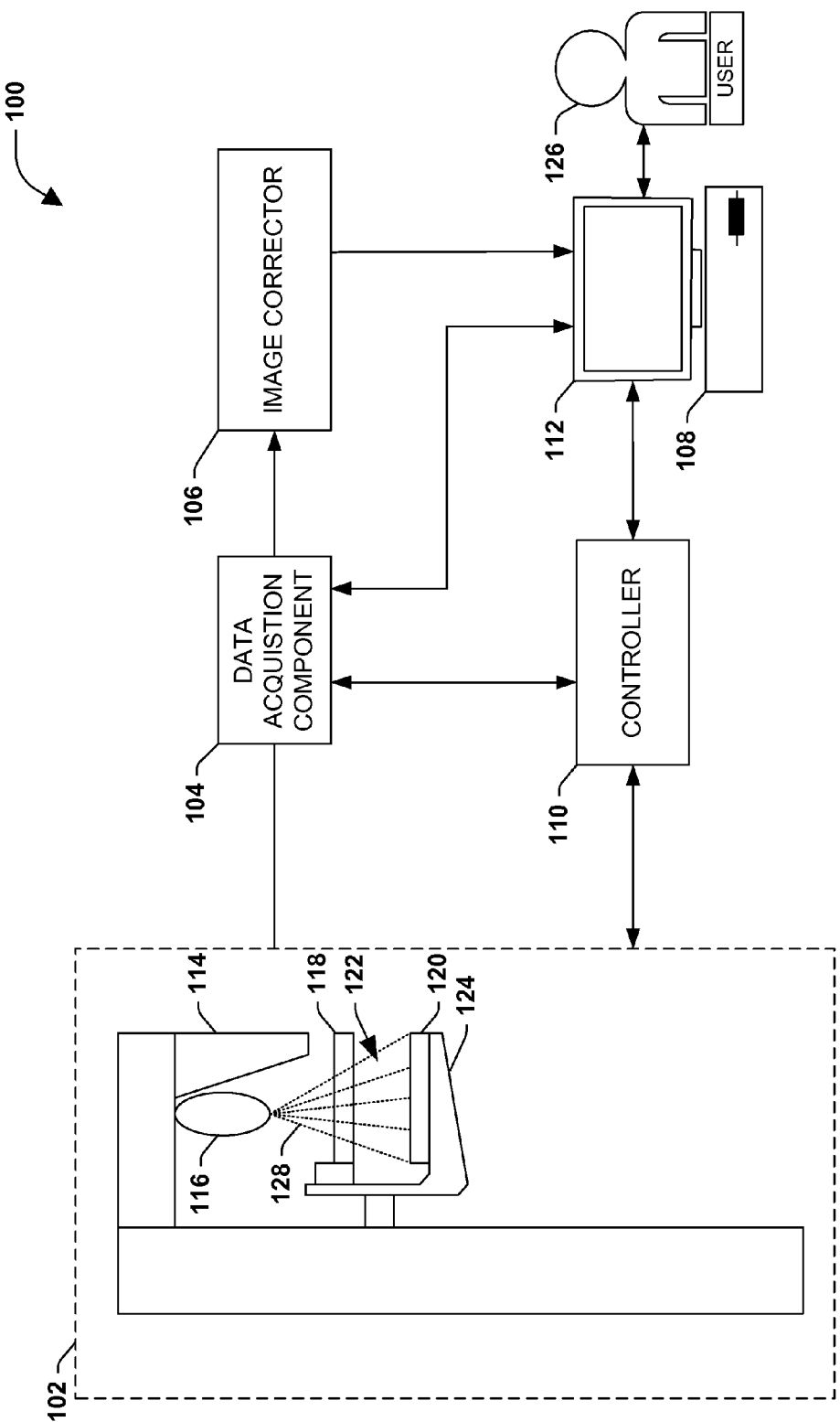
FIG. 1 is a schematic block diagram illustrating an example system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques are provided for introducing a delay between a radiation pulse and signal integration in a pulsed radiographic imaging system comprising an indirect conversion detector array. Stated differently, the signal is integrated such that a portion of a pulsed signal that may be indicative of parasitic contributions caused by radiation photons that interact directly with the photodiode are not integrated and/or are insubstantially integrated. In this way, the parasitic contributions are reduced and the detective quantum efficiency (DQE) of the detector array is increased (e.g. resulting in a better quality image).

FIG. 1 depicts an example system 100. Such an example system 100 may be used for mammography at a medical center, for example. It will be understood to those skilled in the art that the specific configurations of the system may depend upon the intended functions of the system, and thus the systems and/or techniques described herein are not intended to be limited by the configurations of the example system 100. That is, other configurations of pulsed radiography systems that are known in the art are also contemplated. For example, in another embodiment, the system may be configured similar to a computed tomography (CT) scanner used at security checkpoints or medical centers (e.g., wherein the scanner is configured in the shape of a toroid or doughnut and the object being examined is placed in the center of the doughnut shape). In yet another embodiment, the system may be a line scanner similar to baggage scanners that are commonly used at security checkpoints, for example. Essentially, unless indicated otherwise, the disclosure herein is not meant to exclude any particular type of radiography system, apparatus, technique, etc. (e.g., various types of x-ray imaging, radiography, medical/security CT, radiation treatment, etc.).

As illustrated, the system 100 typically comprises an object examination apparatus 102 configured to examine an object(s) (e.g., human tissue). One or more images of the examined object(s) may be presented on a monitor 112 of a terminal 108 (e.g., a computer) for human observation, for example. In this way, aspects of the object(s) that are not visible to the naked eye (e.g., tumors, bone fractures, etc.) may be displayed in the one or more images and, ultimately, may be identified by a user 126. In another example, such as where the system is a baggage scanner at an airport, a threat item inside of a suitcase can be identified based upon an examination of the suitcase, for example.

The object examination apparatus 102 is configured to examine an object(s) under examination and transmit data related to the examination to other components of the system 100. Among other components, the object examination apparatus 102 comprises a pulsating radiation source 116 and a detector array 124. The pulsating radiation source 116 (e.g., an ionizing radiation source) is generally configured to emit pulses of fan, cone, wedge, and/or other shaped radiation 128 configuration into an examination region 122 of the object examination apparatus 102. For example, in one embodiment, the pulsating radiation source 116 may emit a pulse of radiation 128 for approximately 4 microseconds (μs) and then rest for between 3 and 20 milliseconds before emitting a second pulse of radiation. It will be appreciated to those skilled in the art that the amount of energy emitted by the radiation source 116 in a pulse may be a function of the application of the object examination apparatus 102. For example, high energy radiation (e.g., linac-generated MeV x-rays) may be used for imaging in radiation therapy treatments and/or for security cargo inspections, whereas lower energy radiation (e.g., keV x-rays) may be used for medical CT imaging, security imaging, and/or non-destructive testing, for example. It will also be appreciated that the terms "pulse" or "pulsed" or variations thereof or like terms are used broadly herein to refer to a short (e.g., 4 microsecond), intentional emission of radiation that is generally followed by a resting period before another, subsequent, pulse of radiation is emitted. It will be appreciated to those skilled in the art that leakage (e.g., emission of random radiation) during the resting period is not considered to be a pulse at least because such an emission is unintended. For example, if a few radiation photons were to be emitted from the radiation source during a period when the radiation source was deactivated (e.g., during a resting period when no radiation is to be emitted), such an emission would not be considered a pulse. Generally, during a pulse, a substantial amount of energy is emitted for a short interval of time. Similarly, "stop" emitting radiation or the like as provided herein acknowledges that a few errant photons may still persist even though emission of radiation has technically been halted or "stopped".

As the radiation 128 traverses the object(s), the radiation 128 may be attenuated differently by different aspects of the object(s). Because different aspects attenuate different percentages of the radiation 128, an image may be generated based upon the attenuation, or rather the variations in the number of radiation photons that are detected by the detector array 124. For example, more dense aspects of the object(s), such as a bone or metal plate, may attenuate more of the radiation 128 (e.g., causing fewer photons to strike the detector array 124) than less dense aspects, such as skin or clothing.

Radiation 128 that traverses the object(s) under examination (e.g., an object situated in the examination region 122) is detected by the detector array 124 located on a diametrically opposing side of the object from the radiation source 116. As will be described in more detail with respect to FIG. 2, the detector array 124 is an indirect conversion detector array. Such a detector array is configured to convert radiation photons into visible light using a scintillator, such as a Cadmium Tungstate (CWO) scintillator, a Zinc Tungstate scintillator, etc. The visible light may then be converted into electrical charge by a photodetector (e.g., a silicon photodiode, an amorphous silicon photodiode, a charge-coupled device (CCD), etc.) of the detector array 124, for example.

Radiation 128 that traverses high traversal/less dense areas of the object may comprise more radiation energy and thus create a greater electrical charge than radiation that traverses low traversal/more dense areas. Therefore, the electrical charge that is yielded from the detected radiation photons is indicative of properties and/or characteristics of the object(s). Pixels (e.g., a thin-film transistor (TFT) array) of the detector array 124 are configured to detect electrical charge, or a net charge density, and generate an analog signal indicative of the detected charge. It will be appreciated that in some embodiments, pixels are configured to substantially continuously generate a signal, and a pulse (e.g., change in the signal) is generated when electrical charge is detected. In other embodiments, pixels may be configured to not emit a signal unless and/or until charge is detected.

In some embodiments, such as in applications where it is preferable to have the object(s) fixed in a particular orientation for an extended period of time, object supports 118, 120 may be used to maintain the orientation of the object(s). For example, in a mammography system, the object supports 118, 120 may be used to compress breast tissue so as to flatten the breast tissue and improve the quality of the resulting image(s). In other embodiments, the object(s) may be placed on a bed or conveyor belt that is configured to allow the object(s) to lay within and/or pass through the examination region 122, for example. A shield 114 can be configured to protect aspects of the object(s) not being examined, such as a person's head, for example, from being exposed to radiation 128 emitted by the radiation source 116.

The example system 100 further comprises a data acquisition component 104 that is operably coupled to the object examination apparatus 102. The data acquisition component 104 is configured to receive the signals and/or other information related to radiation that was detected by the detector array 124 and to convert the analog signals generated by the pixels into digital signals using analog to digital techniques known to those skilled in the art. Moreover, in one embodiment, the data acquisition component 104 can also be configured to compile the signals into one or more projections of the object (s) using techniques known to those skilled in the art. It will be appreciated that the data acquisition component 104 is described below in further detail with respect to FIG. 3.

The example system 100 also comprises an image corrector 106 that is operably coupled to the data acquisition component 104. The image corrector 106 is configured to correct for artifacts, errors, and/or other image degradation qualities in an image(s) yielded from the signals. For example, the image corrector 106 may be configured to correct for errors in signals that are caused by gains, defects, etc. in the pixels, misalignment of the radiation source 116 and detector array 124, defects in the cover of the detector array 124 (e.g., a carbon fiber protective layer commonly referred to in the art as a Buckycover), defects in the electronic component of the radiography system 100, etc. Moreover, where the signals emitted from the data acquisition component 104 are in projection space, the image corrector 106 may be configured to convert the projection space data into image space data using techniques known to those skilled in the art (e.g., tomosynthesis, backprojection, etc.). In this way, the image(s) may be more formatted in a manner that is more understandable by a user 126 viewing the image(s), for example.

The example system 100 also comprises a terminal 108 (e.g., a computer) configured to receive the data and/or signals from the image corrector 106. The terminal 108, which may comprise a monitor 112, can also be configured to display images of the object to a user 126 (e.g., security personnel, medical personnel, etc.). In this way, the user 126 can inspect the image(s) to identify areas of interest within the object(s). In some embodiments, the terminal 108 can also be configured to receive user input which can direct the object examination apparatus 102 how to operate and/or can be used for calibration of the object examination apparatus 102.

The example system 100 also comprises a controller 110 that is operably coupled to the terminal 108. In one example, the controller 110 is configured to receive user input from the terminal 108 and generate instructions for the object examination apparatus 102 indicative of operations to be performed. For example, the user 126 may want to reexamine the object, and the controller 134 may convert user input into a computer command that instructs the radiation source 116 to output additional radiation. Moreover, as will be described in more detail with respect to FIG. 3, the controller 110 can comprise a triggering component configured to notify the data acquisition component 104 (e.g., via a triggering signal) when to begin an integration of the signals emitted by respective pixels of the detector array 124. For example, the controller 110 may comprise a component that monitors information related to the radiation source 116, such as information related to time intervals for the emission of radiation, and may generate a trigger signal at a predetermined time before and/or after the radiation source 116 is deactivate to no longer emit radiation. Such a trigger signal may inform an integration component of the data acquisition component 104, for example, when to begin an integration on signals emitted by respective pixels.

It will be appreciated that the example system 100 and components of the example system 100 described herein are intended to merely illustrate an example system and are not intended to be construed as limiting the scope of the system and/or claimed subject matter. For example, in one embodiment, the data acquisition component 104 may be part of the object examination apparatus 102. Moreover, the system may comprise components not illustrated and/or provided for herein. For example, the system can comprise a power source configured to power the radiation source 116. Thus, the components of a radiography imaging system may vary and/or the orientation of the described components may differ from the example system 100.

Figure 2:
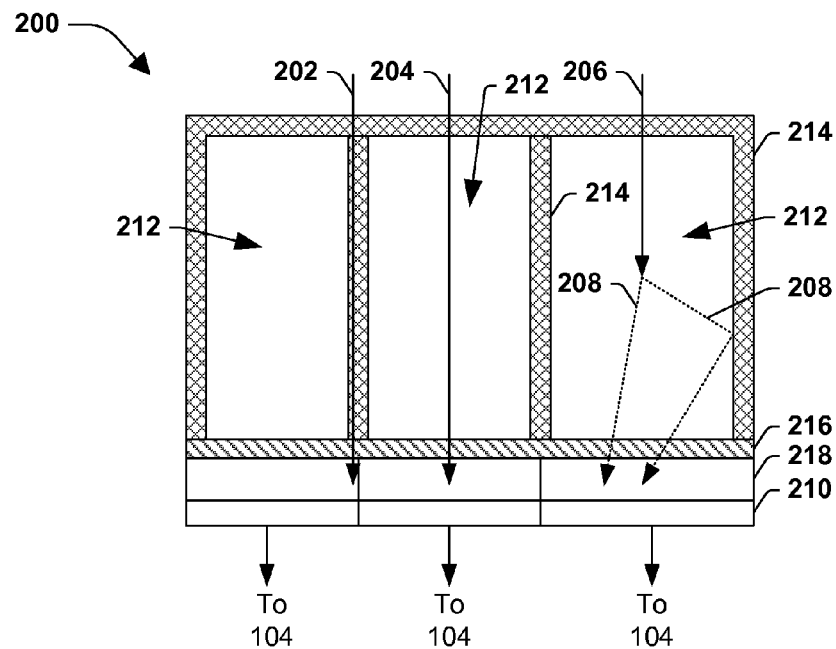
FIG. 2 illustrates a schematic of an example indirect conversion detector array.

FIG. 2 schematically illustrates (e.g., in cross-section) an example indirect conversion detector array 200 (e.g., 124 in FIG. 1). Such a detector array 200 may be an imaging detector for mammography scanners, line scanners, and/or other radiographic imaging systems, for example. The indirect conversion detector array 200 comprises a scintillator 212 and a photodiode 218 (e.g., housed within sidewalls 214 and a substantially translucent base 216). Incident radiation photons 206 normally interact with the scintillator 212, and create luminescence photons 208. These luminescence photons 208 are absorbed in the photodiode 218 and converted into electrical charge, which can be measured by pixels 210 (e.g., a thin film transistor (TFT) array) of the detector array 200.

The scintillator 212 is configured to convert incident radiation photons 206 into luminescence photons 208 and can be made of a crystalline material (e.g., Cadmium Tungstate (CWO), Zinc Tungstate, etc.), a ceramic material, and/or any other scintillating material known to those skilled in the art. Commonly, such scintillator materials are configured to emit light in the visible spectral range, from about 400 nm to about 600 nm, but it will be appreciated that the scope of the instant disclosure and/or claimed subject matter is not intended to be limited as such. For example, the scintillator may emit light in the spectral range below 400 nm and/or above 600 nm.

The photodiode 218 is configured to create a charge when it is exposed to light (e.g., based upon the photovoltaic effect of the photodiode 218). Stated differently, when luminescence photons 208 enter the photodiode 218, electrons in the photodiode 218 (e.g., a semiconducting structure) become excited. That is, if the energy of the luminescence photons 208 is greater than a bandgap energy of the photodiode 218, electrons in the photodiode 218 will move from a valence band onto a conduction band, and electron-hole pairs will be generated. The free electrons created by the electron-hole pairs drift to the edge of the photodiode 218 and a net charge density can be measured by respective pixels 210 of the indirect conversion detector array 200. The pixels 210 are respectively configured to convert the charge into an output signal(s), which can be output to a data acquisition component (e.g., 104 in FIG. 1).

It will be appreciated that the photodiode 218 can be made of silicon and/or any other photodetector material known to those skilled in the art. For example, in one embodiment, the photodiode 218 is made out of a high resistivity silicon wafer, between about 250 μm to 500 μm thick, and is manufactured using planar technology known to those skilled in the art.

It will be appreciated that some of the radiation photons 202 and 204 interact directly with the photodiode 218 without interacting with the scintillator 212 (e.g., the radiation photons 202 and 204 are not converted to luminescence photons 208 before interacting with the photodiode 218). Thus, electron-hole pairs are created by direct conversion of the radiation photons 202 and 204. These directly generated electron-hole pairs provide parasitic contributions to the signal(s) output by the respective pixels 210, and generally the parasitic contribution is significant relative to the contribution made by electron-hole pairs that are created by luminescence photons 208. For example, in the case of a Cadmium Tungstate scintillator 212 coupled to a silicon photodiode 218, a typical indirect conversion detector array 200 will produce approximately 10 electrons/keV, while the radiation photons 202 and 204 that are absorbed in the silicon will produce 276 electrons/keV.

In the past, radiation shielding has been used to protect photodiodes from radiation. Another method of protecting the photodiodes used fiber optic interfaces. Both methods substantially increase the cost of the photodiodes. It will be appreciated that the systems and/or techniques described herein allow the DQE of an indirect conversion detector array (e.g., 200 in FIG. 2) to be increased in a cost-efficient manner, without using costly radiation shielding and/or fiber optic interfaces, for example.

Figure 3:
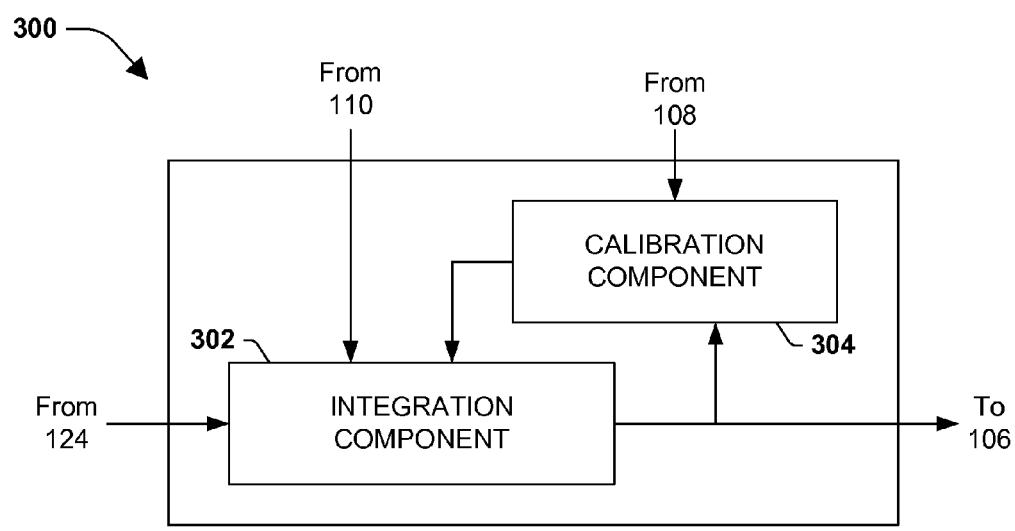
FIG. 3 illustrates a component block diagram of an example data acquisition component.

FIG. 3 illustrates an example data acquisition component 300 (e.g., 104 in FIG. 1) that can be configured to integrate the detected charge to generate a voltage signal, for example. If the generated signal is in the analog domain, the data acquisition component 300 can also be configured to convert the signal from an analog domain to a digital domain using techniques known to those skilled in the art. For example, in one embodiment, the voltage signal may be compared to a ramp signal (e.g., a signal having a known increase/decreasing voltage) and a time when the voltage signal is substantially equal to the ramp signal may be recorded to yield a digital signal.

As illustrated, the data acquisition component 300 comprises an integration component 302 and a calibration component 304. It will be appreciated that the data acquisition component 300 may also comprise other components not shown in the example data acquisition component 300. For example, in one embodiment, the data acquisition component 300 may further comprise a ramp generator and/or a comparator for comparing a ramp signal to the voltage signal(s) from the indirect conversion detector array (e.g., 200 in FIG. 2). Stated differently, systems and/or techniques described herein are not intended to be limited in scope to the data acquisition component 300 described herein. For example, in another embodiment, the calibration component 304, may be part of a terminal (e.g., 108 in FIG. 1) rather than part of the data acquisition component 300 as illustrated herein.

The integration component 302 is configured to integrate electrical charge produced by a photodiode (e.g., 218 in FIG. 2) of an indirect conversion detector array (e.g., 200 in FIG. 2) during a specified interval. Generally the specified interval begins at or after the radiation source has stopped emitting radiation and ends before or when the radiation source resumes emitting radiation. Stated differently, the integration component 302 is configured to integrate electrical charge that is measured (e.g., by pixels 210 in FIG. 2) while the radiation source is resting between pulses of radiation, but not integrate electrical charge that is measured during a pulse of radiation. In this way, parasitic contributions caused by direct interactions between the radiation photons and the photodiode (e.g., 202 and 204 in FIG. 2), which generally decay rapidly, are not integrated (or a least a substantial amount of the contributions are not integrated), while contributions caused by interactions between the luminescence photons and the photodiode (e.g., 208 in FIG. 2), which generally have a slower decay time, are integrated. That is, little to none (e.g., at least less than 50%, but preferably less than 90%) of the electrical charge produced by direct contributions is integrated, but the electrical charge produced by luminescence photons is integrated. In this way, the amount of noise in the signal output by the integration component is reduced, and thus the DQE is increased.

The output of the integration component (e.g., a voltage signal) may be output to the image corrector (e.g., 106 in FIG. 1) and/or to another component of the data acquisition component 300. For example, in one embodiment, the output may be transmitted to analog/digital converter configured to convert the output from the analog domain to a digital domain using techniques known to those skilled in the art.

The start and end times of the integration may be specified by the integration component 302 itself and/or by another component of the radiation scanner. For example, in one embodiment, the integration component 302 is triggered by a trigging component of a controller (e.g., 110 in FIG. 1) that is configured to control the object examination apparatus (e.g., 102 in FIG. 1) and/or the radiation source (e.g., 116 in FIG. 1). When the radiation source is scheduled to stop emitting a pulse of radiation, for example, the trigger component can be configured to send a triggering signal to the integration component 302 that indicates a time when the radiation source will stop emitting the pulse. In this way, the integration component 302 can be made aware of when to start the integration. Moreover, in some embodiments, the trigger component can also be configured to trigger the integration component 302 to end the integration. For example, the trigger component may be configured to send a second signal to the integration component 302 that is indicative of a time when the radiation source will resume emitting radiation (e.g., so the integration component 302 becomes aware of when to stop the integration).

As illustrated, the data acquisition component 300 further comprises a calibration component 304 that is configured to calculate decay time of the parasitic contribution caused by the direct interaction of radiation photons with the photodiode. The is, the calibration component 304 is configured to calculate the length of time it takes for electrical charge produced directly by radiation photons to decay after a pulse of radiation has stopped being emitted from the radiation source using techniques known to those of skill in the art. For example, in one embodiment, the calibration component 304 may repeatedly adjust the start and end times of the integration until the DQE meets a predetermined value. In another example, the calibration component 304 may receive instructions from a terminal (e.g., 108 in FIG. 1) of the scanner that specifies a particular voltage gain and the calibration component 304 may adjust the and end times of the integration until the specified voltage gain is met and/or exceeded. In this way (e.g., by adjusting the start and end times of the integration) the amount of parasitic contribution and/or the amount of contribution yielded from luminescence photons (e.g., wanted contribution) remaining in an output signal of the integration component 302 may be varied by adjusting the start and ends times of the integration.

Once the calibration component 304 has identified a start time and/or an end time, the calibration component may send such information to the integration component 302 and/or the triggering component (e.g., the controller 110 of FIG. 1). In this way, the integration component 302 can adjust the delay between when it receives the triggering signal and when it starts/ends the integration and/or the triggering component can adjust the timing for the transmission of the triggering signal(s).

Figure 4:
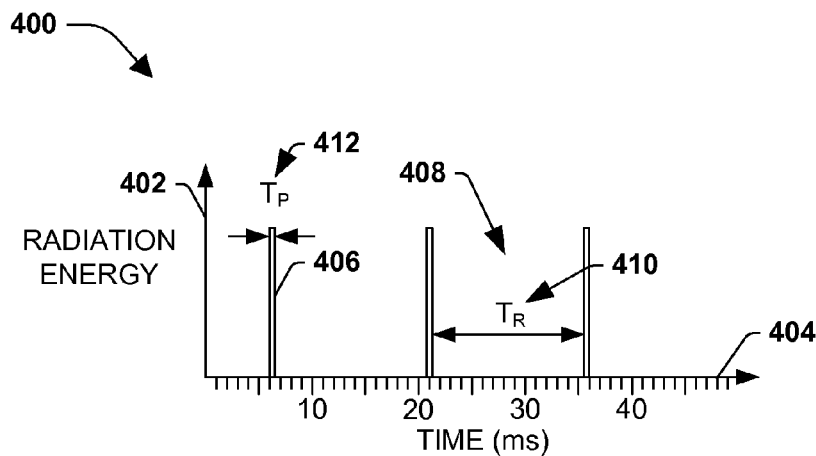
FIG. 4 is an example graph illustrating radiation energy versus time.

FIG. 4 is an example graph 400 illustrating the behavior of radiation energy emitted from a pulsating radiation source (e.g., 116 in FIG. 1). The y-axis 402 represents radiation energy and the x-axis 404 represents time in milliseconds (ms). It will be appreciated that the example graph is merely intended to illustrate the behavior of radiation pulses and may not be drawn to scale. For example, as illustrated, a pulse 406 appears to be emitted for approximately 0.5 milliseconds. However, in practice, such a pulse 406 may be emitted for a much shorter period of time (e.g., 10 microseconds or less).

As illustrated, when the radiation source is emitting radiation during a pulse 406, the amount of radiation energy rapidly peaks, and when the radiation source is resting 408 (e.g., when radiation is not being emitted), the radiation energy rapidly declines to substantially to zero. Generally, the resting period ($T_R$) 410 between pulses is substantially greater than the pulse time ($T_P$) 412. For example, in one embodiment, $T_P$ 412 is approximately 4 microseconds and $T_R$ 410 is between 3 and 30 milliseconds.

Figure 5:
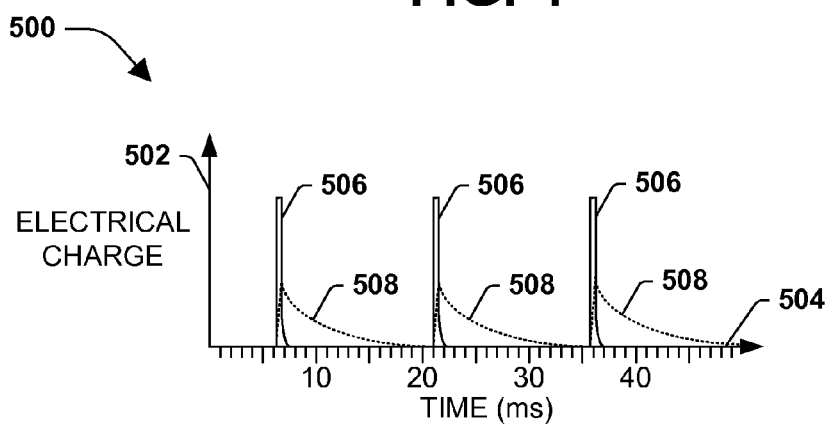
FIG. 5 is an example graph illustrating electrical charge versus time.

FIG. 5, which correlates to FIG. 4, illustrates an example graph 500 of the electrical charge that is detected during an examination of an object. The y-axis 502 represents electrical charge and the x-axis 504 represents time. It will be appreciated that two types of electrical charge are illustrated in the example graph 500. The first, represented by a solid line, is a parasitic contribution 506 caused by electrical charge that is produced by the direct interaction of radiation photons (e.g., 202, 204 in FIG. 2) with a photodiode (e.g., 218 in FIG. 2). Such a contribution is parasitic because it reduces the DQE (e.g., and introduces significant noise into the signal). The second, represented by a dotted line, is a wanted contribution 508 caused by electrical charge that is produced by the interaction of luminescence photons (e.g., 208 in FIG. 2) with the photodiode. Such a contribution is desirable because it is used to generate an image of the object(s) under examination.

As illustrated, the parasitic contribution 506 parallels the path of the pulse 406 in FIG. 4. That is, it begins almost immediately after the pulse 406 begins and decays to substantially zero within a very short time span of the pulse 406 ending. For example, depending on the scintillator and photodiode used, the parasitic contribution 506, may decay to substantially zero within one microsecond of the pulse 406 ending.

On the other hand, the wanted contribution 508 decays more slowly. That is, the wanted contribution 508 begins when the pulse begins (and may peak during the pulse), but the decay of the wanted contribution 508 is generally slower than the decay of the parasitic contribution 506. For example, as illustrated, the wanted contribution 508 does not decay to substantially zero until shortly before the next pulse begins. It will be appreciated that the decay time of the wanted contribution 508 is a function of the scintillator material and/or the photodiode and thus the wanted contribution 508 may decay more rapidly (or more slowly) than illustrated. However, generally, the wanted contribution 508 decays more slowly than the parasitic contribution 508.

Figure 6:
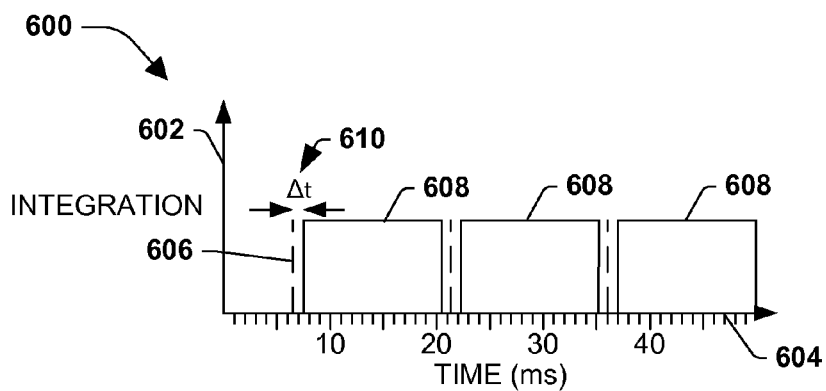
FIG. 6 is an example graph illustrating integration versus time.

FIG. 6, which correlates to FIGS. 4 and 5, illustrates an example graph 600 of the integration of the electrical charge. The y-axis 602 represents the integration and the x-axis 604 represents time. The vertical, dotted lines 606 represent the end of a radiation pulse. Generally, the integration component (e.g., 302 in FIG. 3) is configured to integrate 608 electrical charge that is produced after a pulse of radiation (but not electrical charge produced during the pulse). Thus, the integration component is configured to begin the integration 608 after the radiation source stops emitting a pulse of radiation.

As illustrated, the time between when the pulse of radiation ends and when the integration begins may be characterized as Δt 610, where Δt 610 is n microseconds (e.g., 0-10 microseconds) after the radiation has stopped being emitted. It will be appreciated that Δt may be a function of the time it takes for the parasitic contribution 506 in FIG. 5 to decay to some predetermined threshold (e.g., 90% decay) and/or it may be a function of a desired voltage gain. For example, to decrease the voltage gain, a user may increase Δt such that the ratio of the input energy relative to the output decrease. It will be also be appreciated that Δt 608 can vary based upon the scintillator material, the photodiode, the energy of the emitted radiation, etc. For example, where the indirect conversion detector array (e.g., 200 in FIG. 2) comprises a Cadmium Tungstate scintillator (e.g., 212 in FIG. 2) and a silicon pin photodiode (e.g., 218 in FIG. 2), Δt may equal 1 microsecond or less because the response time of a silicon pin photodiode (from when a radiation photon is detected) is less than 1 microsecond, whereas the decay time of a Cadmium Tungstate luminescence is approximately 15 microseconds.

It will be appreciated that by delaying the integration such that a portion (e.g., substantially all) of the parasitic contribution 506 has decayed, the amount of (Swank) noise (e.g., noise created due to the difference in conversion factors for direct and indirect conversion of radiation photons into electrical charge) in the output signal of the integration component (e.g., 302 in FIG. 3) may be substantially reduced, and thus the DQE can be increased. Moreover, by varying the delay, the voltage gain related to the detector can be varied to a predetermined gain (e.g., in order to optimize electronics). Gain variation may be particularly useful, for example, where MeV radiation is emitted so as to reduce the voltage of the signal such that the signal can be used by variable electronics, for example.

It will also be appreciated that a portion (including possibly the peak) of the wanted contribution 508 may decay before the integration begins and thus a portion of the wanted contribution 508 would be excluded from the integration. While this is generally undesired because of detector gain reduction, the information that is used to reconstruct an image of the object(s) is not lost (or at least not substantially lost), because the remaining integrated signal is created substantially entirely by the contribution of radiation photons that are indirectly converted to electrical charge. Thus excluding the parasitic contribution 506 from the integration may substantially reduce the noise, and thus the signal to noise ratio may increase by delaying the integration. Stated differently, the benefit to reducing the parasitic contribution 506 outweighs the cost of losing a portion of the wanted contribution 508.

Figure 7:
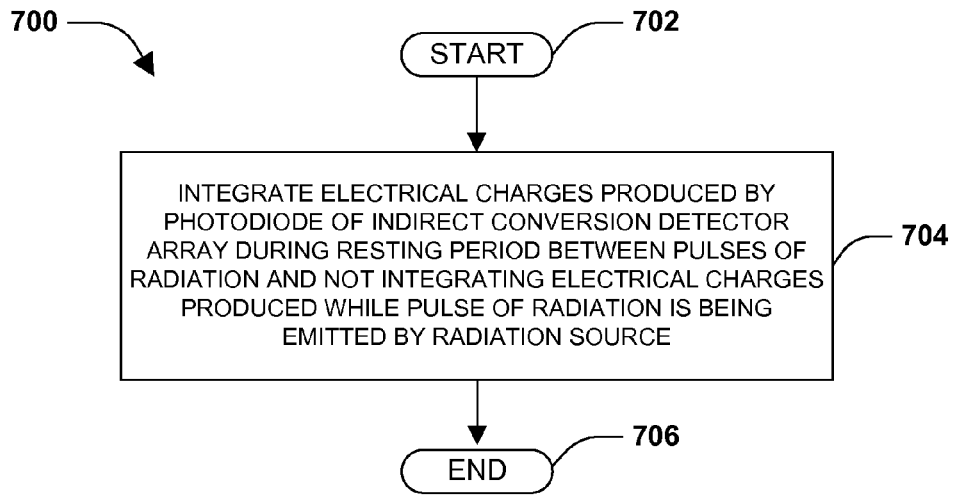
FIG. 7 is a flowchart of an example method.

FIG. 7 illustrates an example method 700, which may be used for integrating electrical charges produced by an indirect conversion detector array (e.g., 200 in FIG. 2), for example. The example method 700 begins at 702 and electrical charges produced by a photodiode of an indirect conversion detector array during a resting period between pulses of radiation are integrated at 704. Electrical charges produced while a pulse of radiation is being emitted by a radiation source (e.g., 116 in FIG. 1) are typically not integrated. In this way, parasitic contributions (e.g., contributions caused by electrical charge produced by the direct interaction of radiation photons with a photodiode of the indirect conversion detector array) are substantially excluded from the integration (e.g., 50% or more of the electrical charge is excluded), while wanted contributions (e.g., contributions caused by electrical charge produced by the interaction of luminescence photons with the photodiode) are integrated.

Stated differently, when radiation photons impinge an indirect conversion detector array, the radiation photons can generally interact with the photodiode in two ways, directly and indirectly. Radiation photons interact directly with the photodiode when the radiation photons pass through a scintillator material (e.g., without interacting with the scintillator material) and impinge the photodiode. Radiation photons interact indirectly with the photodiode when the radiation photons interact with the scintillator material and generate luminescence photons, which in turn interact with the photodiode. In an indirect conversion detector array, the direct interaction of the radiation photons with the photodiode generates noise that reduces the quality of a resulting image(s) produced from the examination of an object(s) (e.g., the DQE for direct conversion is generally much smaller than DQE for indirect conversion, because of the low atomic number of silicon or other photodiode material compared to a scintillator). Further, because the energy produced by a direct interaction is much greater (e.g., 276 electrons/keV) than an indirect interaction (e.g., 10 electrons/keV), contributions caused by the direct interaction can be significant (e.g., the noise can noticeably affect the quality of the image). Thus, by integrating in such a manner that the parasitic contribution (e.g., caused by the direct interaction) is reduced improves the DQE (e.g., the ratio of the amount of information contained in the output signal to the amount of information in the incident radiation flux) and/or improves the quality of images resulting from the signal, for example.

It will be appreciated to those skilled in the art that the integration can be defined by a start time (e.g., a time when the integration begins) and a finish time (e.g., a time when the integration ends). Electrical charges that are measured between the start time and the finish time are integrated, and electrical charges that are measured outside of this range are not integrated.

Generally, the start time is set to some point of time during the resting period (e.g., a period between two pulses of radiation) and the end time is set to a different, later point of time during the resting period, such as a time substantially immediately prior to the emission of a subsequent pulse of radiation. It will be appreciated that the start time may be set to any point of time during the resting period and may be a function of the time it takes for electrical charge produced by direct interaction to decay and/or a specified/predetermined voltage gain related to the indirect conversion detector array, for example. It will be appreciated that the indirect conversion detector array generally outputs an analog signal of electrical current, and that a voltage gain related to the indirect detector can be attained by applying an amplifier to the readout or analog current output by the detector, for example. The point being, that start time may be set based on one or more of any number of criteria, such as decay and/or voltage gain, for example. In one embodiment, the integration may begin at the start of the resting period (e.g., substantially immediately upon the radiation source being deactivated such that it is not emitting radiation) and integration may stop at the end of the resting period (e.g., a time substantially immediately before the radiation source is activated to emit a pulse of radiation). In another embodiment, the integration may be delayed from the start of the resting period (e.g., by 1 microsecond or less), such that it begins after the resting period begins). In this way, electrical charge produced by the radiation photons may decay (e.g., to less than 50%, but preferably to substantially zero) before the electrical charge yielded from the pixels is integrated. In yet another embodiment, at least one of the start time and the end time may be adjusted as a function of a specified/predetermined voltage gain related to the indirect conversion detector array. For example, where MeV radiation is emitted from the radiation source, the voltage that is typically yielded from the electrical charge produced by directly and/or indirectly by impinging radiation may be too great to use with variable electronics. Thus, by altering the start time and/or the end time of the integration (e.g., such that the time span on the integration is reduced), the gain may be reduced so that the signal is more suited for use with variable electronics, for example.

It will be appreciated that by not integrating electrical charge produced while a pulse of radiation is being emitted and/or by delaying the start of the integration until sometime after the beginning of the resting period, a substantial portion (e.g., 50% or more) of the contribution caused by the direct interaction of radiation photons with the photodiode can be reduced. For example, in one embodiment, substantially all of the electrical charge produced by the radiation photons that impinge the photodiode can be excluded from the integration. Further, it will be appreciated that while delaying the integration can also cause electrical charge generated by the interaction of luminescence photons with the photodiode (e.g., a wanted contribution) to be excluded, the luminescence photons generally decay more slowly than the radiation photons, and thus a sufficient amount of the electrical charge can be integrated. Moreover, the reduction in noise is generally greater than the reduction in the signal, and therefore, the signal-to-noise ratio generally increases substantially by excluding a portion of the electrical charge.

The example method ends at 706.

Figure 8:
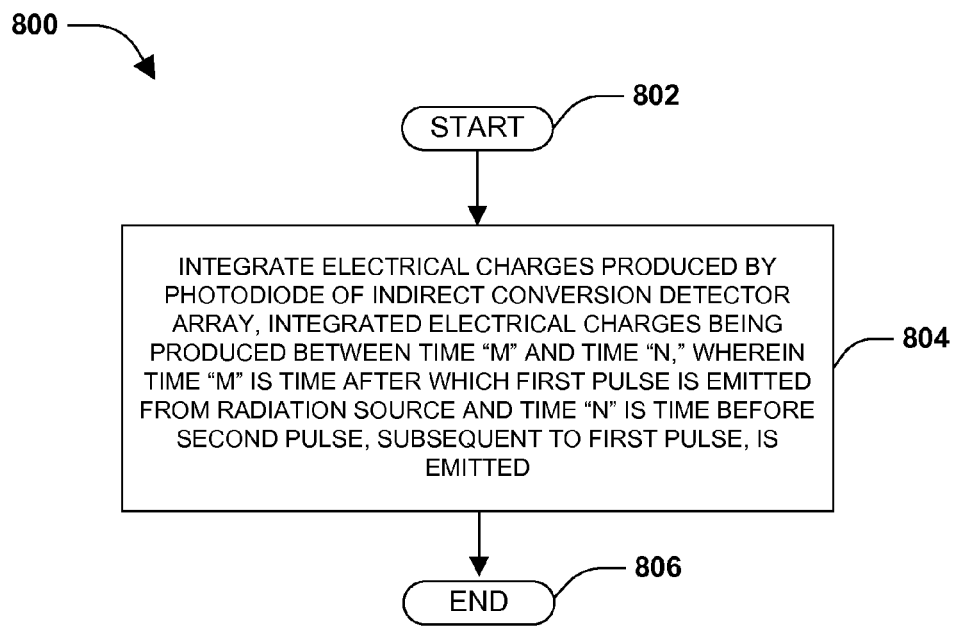
FIG. 8 is a flowchart of an example method.

FIG. 8 illustrates an example method 800, which may be used for integrating electrical charge generated by an indirect conversion detector array, for example. The method begins at 802 and electrical charges produced between time "m" and time "n" by a photodiode of an indirect conversion detector array are integrated at 804. Generally, time "m" is a time after which a first pulse is emitted from a radiation source during an examination operation and time "n" is a time before a second pulse, subsequent to the first pulse, is emitted during an examination operation. Stated differently, time "m" and time "n" are two points of time comprised in a resting period (e.g., 410 in FIG. 4) of a radiation source. Thus, electrical charges produced while a pulse of radiation is being emitted by a radiation source are generally not integrated. In this way, a portion of the electrical charge yielded from radiation photons interacting directly with a photodiode are not integrated (e.g., reducing the noise in the signal and/or improving the DQE of the indirect conversion detector array).

It will be appreciated that time "m" can be any number greater than or equal to zero and time "n" can be any number greater than zero, but "n" is greater than "m." For example, in one embodiment time "m" is equal to 1 microsecond (e.g., there is a delay between the pulse ending and/or the radiation source being deactivated and the time of integration), and thus electrical charge measured while the pulse is being emitted and/or within 1 microsecond thereafter is not integrated. Moreover, time "n" may be 10 milliseconds, for example, so electrical charge measured 1 or more microseconds after the pulse has ended but less than 10 milliseconds after the pulse has ended would be integrated.

It will be appreciated that the times "m" and/or "n" may be a function of the time it takes for radiation photons to decay and/or it be a function of a specified/predetermined voltage gain. For example, in one embodiment, radiation photons decay by a specified percentage (e.g., 90%) within 1 microsecond, so time "m" is set to some time greater than or equal to 1 microsecond after the pulse has ended. In another embodiment, such as where the emitted radiation comprises a substantial amount of energy (e.g., MeV radiation), times "m" and/or "n" may be reduced (e.g., the span of the integration is reduced) to reduce the voltage of an output signal of the integrator so that the output signal can be used with variable electronics, for example.

The example method 800 ends at 806.

Figure 9:
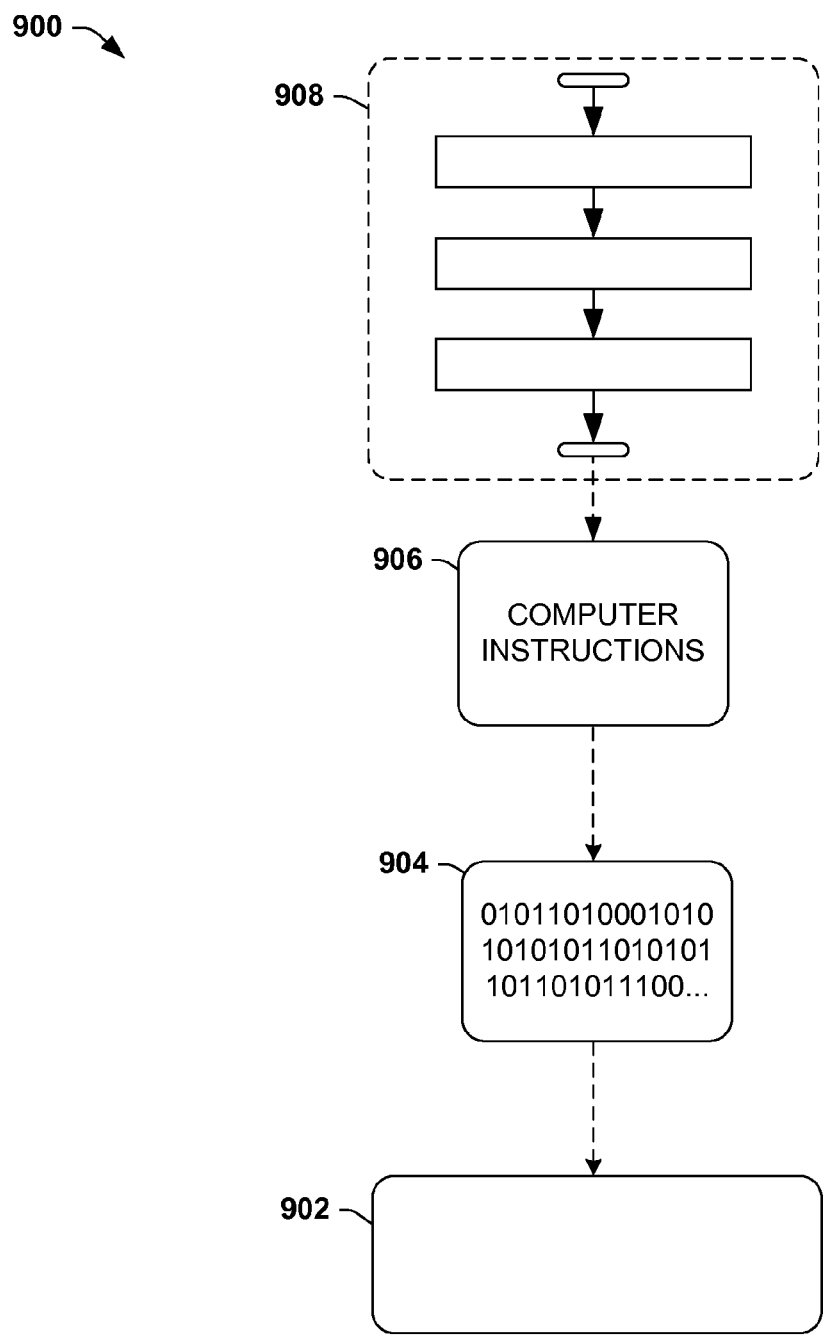
FIG. 9 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 9, wherein the implementation 900 comprises a computer-readable medium 902 (e.g., a flash drive, CD-R, DVD-R, or a platter of a hard disk drive), on which is encoded computer-readable data 904. This computer-readable data 904 in turn comprises a set of computer instructions 906 configured to operate according to one or more of the principles set forth herein. In one such embodiment 900, the processor-executable instructions 906 may be configured to perform a method 908, such as the example method 700 of FIG. 7 and/or example method 800 of FIG. 8, for example. In another such embodiment, the processor-executable instructions 906 may be configured to implement a system, such as at least some of the exemplary system 100 of FIG. 1, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   integrating electrical charges produced by a photodiode of an indirect conversion detector array during a resting period between pulses of radiation and not integrating electrical charges produced while a pulse of radiation is being emitted by a radiation source.

2. The method of claim 1, wherein the integration is defined by a start time and a finish time, the start time indicative of when to start the integration and the finish time indicative of when to stop the integration, the method comprising:
   setting the start time to a time after which electrical charge produced by radiation photons impinging the photodiode has decayed.

3. The method of claim 2, wherein the start time is set to a time after which electrical charge produced by the radiation photons impinging the photodiode has decayed by at least fifty percent.

4. The method of claim 2, wherein the start time is set to a time after which electrical charge produced by the radiation photons impinging the photodiode has decayed by at least ninety percent.

5. The method of claim 2, comprising:
   adjusting at least one of the start time or the end time of the integration as a function of a specified voltage gain related to the indirect conversion detector array.

6. The method of claim 1, comprising:
   excluding from the integration substantially all of the electrical charge produced by radiation photons that impinge the photodiode.

7. The method of claim 6, wherein the electrical charge produced by direct conversion of radiation photons is substantially excluded by adjusting a start time of the integration such that the electrical charge produced by direct conversion of radiation photons has substantially decayed to zero.

8. The method of claim 7, comprising
   adjusting at least one of the start time or the end time of the integration as a function of a specified voltage gain related to the indirect conversion detector array.

9. A radiography examination apparatus, comprising:
   an integration component configured to integrate electrical charge produced by an indirect conversion detector array during a specified time interval to generate a signal; and
   a trigger component configured to specify a start time of the integration, the trigger component configured to trigger the integration component to start the integration during a resting period between pulses of radiation during an examination operation.

10. The apparatus of claim 9, comprising an ionizing radiation source configured to emit one or more pulses of radiation.

11. The apparatus of claim 9, comprising an indirect conversion detector array configured to generate the electrical charge, the indirect conversion detector array comprising:
    a scintillator configured to convert radiation photons into luminescence photons; and
    a photodiode configured to convert the luminescence photons into electrical charge.

12. The apparatus of claim 9, wherein the trigger component is configured to trigger the integration component to end the integration, wherein a duration of the integration is a function of a specified voltage gain related to the indirect conversion detector array.

13. The apparatus of claim 9, comprising a calibration component configured to calculate a length of time it takes for electrical charge produced directly by radiation photons to decay during the resting period, wherein the trigger component is configured to use the calculation to determine when to trigger the integration component to start the integration.

14. The apparatus of claim 13, wherein the trigger component is configured to trigger the integration component to start the integration at a time equivalent to a time in which at least fifty percent of the electrical charge produced directly by radiation photons has decayed.

15. The apparatus of claim 14, wherein the trigger component is configured to trigger the integration component to end the integration, wherein a duration of the integration is a function of a specified voltage gain related to the indirect conversion detector array.

16. The apparatus of claim 9, wherein the trigger component is configured trigger the integration component to start the integration "n" microseconds after the resting period begins.

17. The apparatus of claim 16, wherein "n" is a function of a time it takes for electrical charge produced directly from radiation photons to decay.

18. A method, comprising:
   integrating electrical charges produced by a photodiode of an indirect conversion detector array, the integrated electrical charges being produced between time "m" and time "n," wherein time "m" is a time after which a first pulse is emitted from a radiation source during an examination operation, and time "n" is a time before a second pulse, subsequent to the first pulse, is emitted during the examination operation.

19. The method of claim 18, wherein time "m" is a time after which substantially all of the electrical charge produced directly by radiation photons has decayed to zero.

20. The method of claim 18, wherein time "m" is at least 0.1 microseconds after the first pulse of radiation has stopped being emitted from the radiation source.

* * * * *